United States Patent [19]

Romak

[11] 4,144,652
[45] Mar. 20, 1979

[54] WHEEL ALIGNMENT CHECKER TOOL ASSEMBLY

[76] Inventor: Albert Romak, 429 Major Dr., Northlake, Ill. 60164

[21] Appl. No.: 861,259

[22] Filed: Dec. 16, 1977

[51] Int. Cl.² .............................................. G01B 5/24
[52] U.S. Cl. .................................................. 33/203.20
[58] Field of Search ........ 33/180 AT, 203.15, 203.16, 33/203.17, 203.18, 203.19, 203.20, 203.21

[56] References Cited

U.S. PATENT DOCUMENTS

| | | | |
|---|---|---|---|
| 1,829,133 | 10/1931 | Frykman | 33/203.20 |
| 2,532,593 | 12/1950 | Bender et al. | 33/203.20 |
| 2,624,123 | 1/1953 | Wilkerson | 33/203.20 |
| 2,899,753 | 8/1959 | Hair | 33/203.21 |
| 3,624,914 | 12/1971 | Kosteriva | 33/203.20 |

*Primary Examiner*—Richard R. Stearns
*Attorney, Agent, or Firm*—Lester N. Arnold

[57] ABSTRACT

A pair of frame members are fixedly attached to and in parallel alignment with a pair of front tires of an automobile and so as to provide forwardly extending portions thereof, respectively, upon which are further provided alignment reference means including inner reference positions in close proximity to the front-most surface of an associated tire and outer reference positions in removed proximity to the associated tire, a cross-arm frame member is to be positioned across the forwardly protruding extensions of the frame members firstly in alignment with the inner reference positions and secondly in alignment with the outer reference positions, and indicator means on the cross-arm frame member indicates any difference in alignment thereof between the inner and outer reference positions for measurements of toe-in and toe-out wheel misalignment.

6 Claims, 6 Drawing Figures

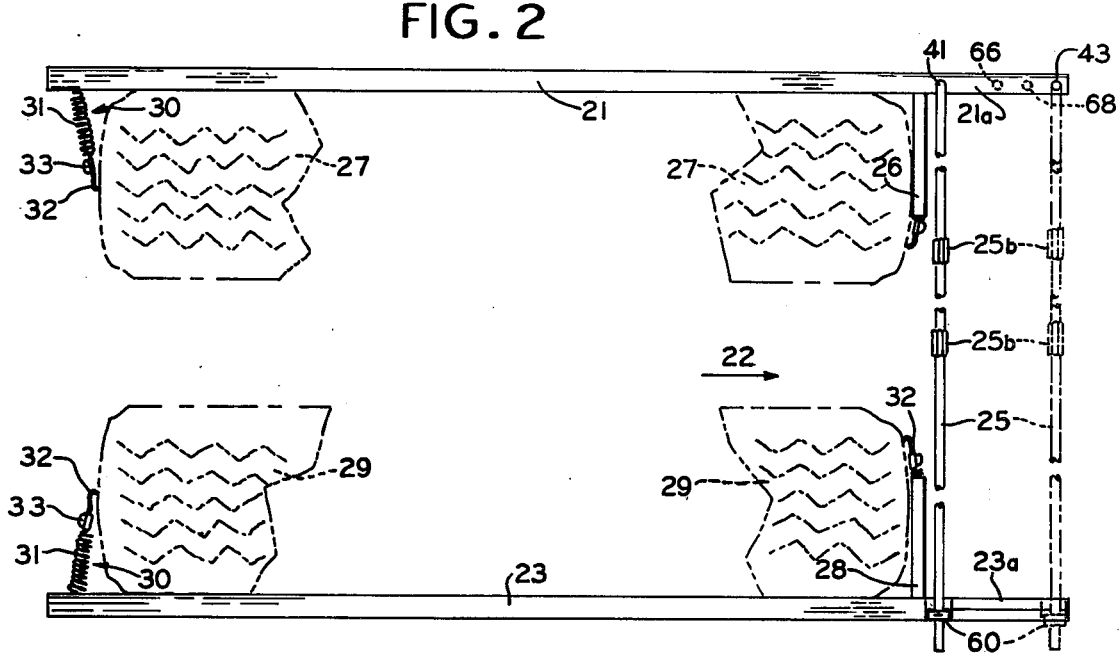
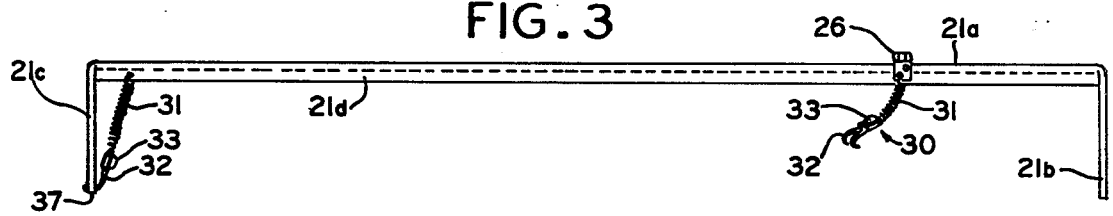
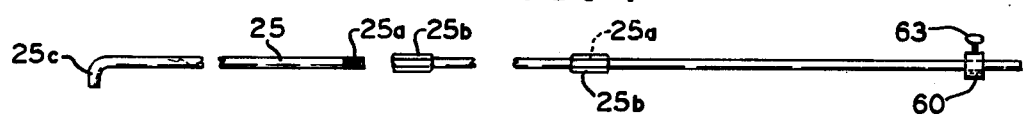
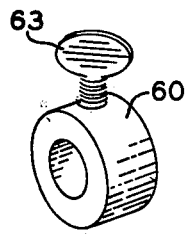
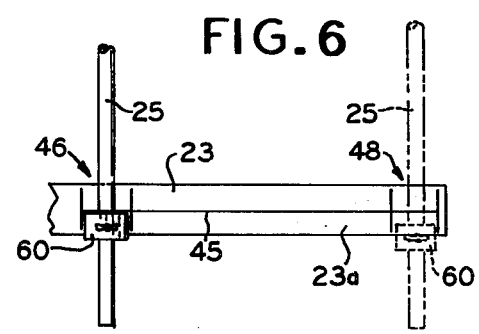

WHEEL ALIGNMENT CHECKER TOOL ASSEMBLY

BACKGROUND OF THE INVENTION

1. Field of the Invention

This invention relates generally to automobile front wheel alignment, and more particularly, relates to a novel tool assembly for testing for toe-in or toe-out misalignment condition of the front wheels of an automobile.

2. Description of the Prior Art

It is generally known that automobile wheel assemblies are subject to misalignments due to various causes including passage of wheels over rough terrain, striking of obstacles and improper or damaged tie rod assemblies. When misalignment is presently suspected to exist for whatever reason, the automobile front end wheel assembly and its associated adjustable tie rod linkage assemblies, are checked for proper alignment and adjustment by means of elaborate and generally expensive complex alignment equipment capable of measuring for caster and camber as well as toe-in or toe-out condition of the front wheels of such vehicles. The present methods and procedures of checking front end steering alignment requires certain standard checks and compensating adjustments in a well known manner in which no significant labor is saved even though performed on a front end steering assembly which is not in fact misaligned or out-of-tolerance. The difficulty lies for the most part with the state of the art wherein there is no known less complicated and more convenient checker or testing tool to permit consumer detection of front-end wheel misalignment without subjecting the front end steering assembly of the automobile to the standard methods and procedures of adjusting axial tie rods and linkage members of the steering assembly.

It is thus desirable to provide a checker tool assembly which is adapted to be used by the consumer to test for proper front wheel alignment without having to subject the automobile front end steering assembly to the present methods and procedures of checks and adjustments. If misalignment is then detected, standard alignment procedures could be advantageously employed. Such a testing device is advantageously adapted to be used without the necessity of elevating the wheels for free rotation thereof, or to gain access to the front end steering linkages and tie rods for adjustments thereto. Such a testing device as disclosed herein is disposed for limitation to checking for toe-in or toe-out misalignment condition of the front wheels of the automobile. If misalignment condition is detected, then the automobile could be subjected to the present methods and procedures of corrective alignment with the confidence of the consumer that such alignment is indeed required in order to obviate abnormal tire wear. It is desired that such a checker tool assembly be simple in its construction and application, and readily adaptable for usage by the consumer upon almost any four wheel vehicle and at almost any parking location for the vehicle.

SUMMARY OF THE INVENTION

An automobile front wheel alignment checker tool assembly includes a pair of separable frame members to be positioned in parallel alignment with the front left tire and the front right tire of an automobile, respectively. Each frame member provides an inwardly directed extension or arm member to abut the front surface of the associated tire in order to determine the front-rear position of the frame member with respect to the associated tire. Further, each frame member is provided with flexible extendible gripper means adapted to grip the front and rear of the associated tire for providing and maintaining the parallel relationship between the frame member and the associated tire. The frame members are generally elongated for providing predetermined forward extension beyond the front surfaces of the associated tires. Alignment reference means are provided on the forward extensions thereof, having inner and outer alignment reference positions respectively. A cross-arm frame member is firstly positioned for extension between the separated frame members and in alignment reference to the inner reference positions of the pair of separated frame members, respectively. An adjustable indicator as mounted on the cross-arm frame member is firstly fixedly aligned in a predetermined manner with the inner reference positions. The cross-arm frame member is secondly positioned for extension between the separated frame members and in alignment reference to the outer reference positions of the pair of separated frame members, respectively. The fixedly aligned indicator on the cross-arm frame member is secondly readjusted for alignment with the outer reference positions, and the direction of the lateral movement along the cross-arm frame member is determinative of either toe-in or toe-out misalignment of the front wheels of the automobile, and the length of lateral movement is determinative of the degree or amount of toe-in or toe-out.

An automobile alignment checker tool assembly is comprised of a left-most frame member to be fixedly positioned in parallel relationship to the left-most front tire of an automobile, a right-most frame member to be fixedly positioned in parallel relationship to the right-most tire of the automobile, and each have forwardly extending frame portions thereof, alignment reference means provided on the forwardly extending frame portions and having inner and outer alignment reference positions provided thereon, respectively, a cross-arm frame member firstly to be extended between the left-most and right-most frame members with respect to the inner alignment reference positions thereof, and secondly to be extended between the left-most and right-most frame members with respect to the outer alignment reference positions thereof, and adjustable indicator means on the cross-arm frame member having differing alignments between inner and outer reference positions indicative of toe-in or toe-out misalignment of the front tires of the automobile.

A method of checking for misalignment of the front tires of an automobile comprising the steps of: affixing a pair of elongated main frame members to abut associated ones of the front tires of the automobile for extension of forward portions thereof forwardly of the tires, respectively, marking the forwardly extending portions of the frame members with alignment reference means including inner and outer alignment reference positions thereof, extending a cross-arm frame member between the forwardly extending portions of the pair of frame members in alignment with the inner reference positions thereof, moving adjustable indicator means mounted on the cross-arm frame member into predetermined alignment with the inner reference position of a selected one of the pair of frame members, extending the cross-arm frame member between the forwardly extending portions of the pair of frame members in alignment with the outer reference positions thereof, and measuring the length and direction along the cross-arm frame member that the adjustable indicator means is out of alignment with the outer reference position of the selected one of the pair of frame members to determine the magnitude and type of directional misalignment of the front tires of the automobile.

It is an object of the present invention to provide an economical and simple apparatus and method of use therefor to check a front end wheel assembly of an automobile for toe-in or toe-out misalignment directional conditions.

It is another object of the invention to provide a checker tool assembly for testing use by the consumer upon a multiplicity of automobiles, trucks and vans having a variety of tire sizes and wheel base width settings for the front end wheel assemblies.

It is still another object to provide an apparatus and method of checking for directional misalignment of vehicular front end wheel assemblies which directly provides degree or magnitude of misalignment through length of lineal movement of indicator means, and type or identification of misalignment through direction of lineal movement of the indicator means with respect to the wheel assembly.

It is yet another object to provide a pair of elongated frame members to be fixedly attached to the pair of front tires of the automobile, respectively, each having an extension portion extending forwardly of the associated tire and at least a selected one thereof being marked with an inner reference position and an outer reference position, a cross-arm frame member and adjustable indicator means mounted thereon, which indicator means are movable lineally along the cross-arm frame member firstly for first alignment with the inner reference position of the frame member and secondly for second alignment thereof with the outer reference position of the frame member whereby the direction of and length of lineal movement required for the second alignment is indicative of toe-in or toe-out wheel misalignment.

Further objects and advantages to be obtained in the practice of this invention will occur to those skilled in the art appurtenant to the present invention as a description of the invention is set forth hereinafter in connection with the drawings which illustrate a preferred embodiment thereof.

BRIEF DESCRIPTION OF THE DRAWINGS

FIG. 2 is a top view of the checker tool assembly shown attached to a pair of coaxially aligned wheels and illustrating movement of parts thereof by dashed lines;

FIG. 3 is a side view of a selected main frame member as viewed from a generally interior position with respect to the wheel assembly of FIG. 2;

FIG. 4 is a side view of discontinued portions of a cross-arm frame member showing threaded engagement between parts thereof and a slide member mounted thereon;

FIG. 5 is a perspective view of the slide member which serves as adjustable indicator means; and FIG. 6 is a top fragmentary view of a portion of the main frame member having alignment reference positions thereon and showing the difference in alignment of the slide member with respect thereto with movement of the cross-arm frame member.

DESCRIPTION OF THE PREFERRED EMBODIMENT

Figure 1:
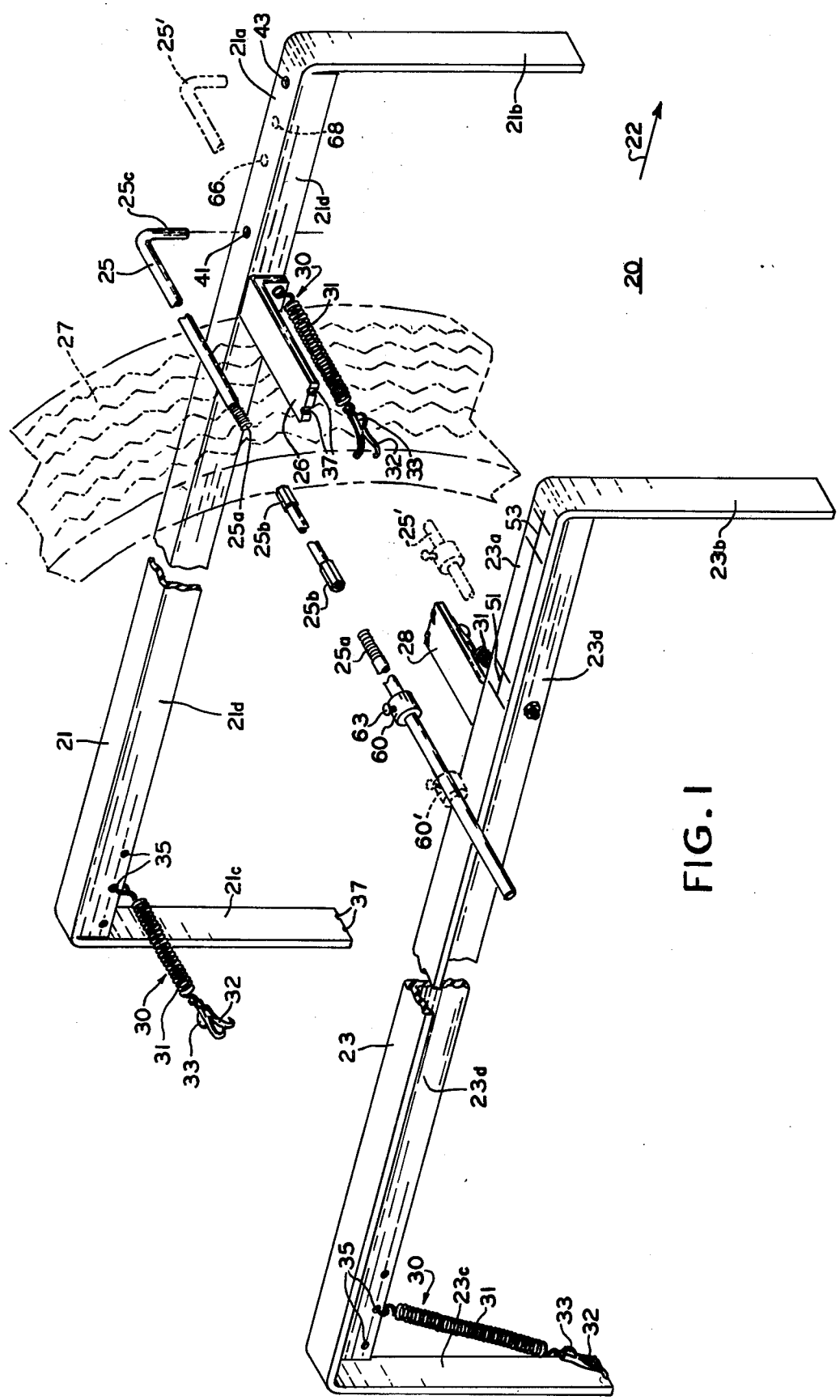
FIG. 1 is an exploded frontal fragmentary perspective view of the checker tool assembly for use in accordance with the present invention and generally shown in its assembled position with sections thereof removed and illustrating movement of parts thereof by dashed lines.

Referring to FIG. 1, there is illustrated the principal parts of the present invention shown in a preferred embodiment thereof comprising a checker tool assembly 20 including a left-most or first legged main frame member 21 and a right-most or second legged main frame member 23 (left-most and right-most references are defined when facing in the direction indicated by arrow 22 in FIG. 1), and further including a cross-arm or traversely positioned frame member 25. The left-most main frame member 21 is shown in usage position with respect to a wheel or tire of a wheeled vehicle (not shown), only a dashed line fragment 27 of such a tire being shown in FIG. 1. The left-most and right-most frame members 21 and 23 are generally elongated so as to extend forwardly of their associated tires, thus defining forward extension portions thereof 21a and 23a, respectively. Forward and rearward portions of the main frame members 21 and 23 are desirably turned downwardly to depend at substantially right angles in order to define forward and rear leg portions or means 21b and 21c and 23b and 23c, respectively.

The main frame members 21 and 23 comprise a pair of separable frame members but function in cooperation together to comprise first frame means and the cross-arm frame member 25 comprises second frame means. FIG. 2 shows a pair of wheels or tires 27 and 29 in dashed lines which tires are referenced herein as left-most and right-most tires, respectively, with respect to the direction of the arrow 22 therein. The frame members 21 and 23 are provided with inwardly directed extension or arm members 26 and 28, respectively, which are positioned to abut or engage the frontal surface of the associated tire 27 or 29, respectively, with the main frame members being properly positioned for testing for directional misalignment of the tires in accordance with the present invention.

The main frame members 21 and 23 are secured or attached to the associated tire 27 or 29 through the use of flexible extendible gripper means 30 comprised of flexible extendible spring coils 31 and terminal end attached hooking means such as a two-prong claw 32. The gripper means 30 are provided with grip plates 33 to facilitate the handling of the gripper means during hooked attachment to the associated tire 27 and 29, respectively. In a preferred hooking or gripping arrangement as shown in FIGS. 1 and 2, a pair of the gripper means 30 is provided for each of the frame members 21 and 23, and each pair thereof is desirably attached forwardly and rearwardly of each of the frame members 21 and 23 so as to be readily extendible to grip or hook onto the frontal and rearward surfaces of the associated tires 27 and 29, respectively.

It is found to be convenient to provide a plurality of spaced apart apertures 35 along the rear portion of the main frame members 21 and 23 whereby the spring coil 31 can be suitably attached to compensate for differing radial dimensions and sizes of wheels. When the main frame members 21 and 23 are not attached to an associated wheel, it is convenient to provide that the gripper means 30 of each such main frame member be attached for storage to the main frame member 21 or 23. It is provided that the forward grippers 30 are to be attached to the adjacently disposed extension arm members such as 26 and 28, and the rearward grippers 30 are to be attached to the adjacently disposed rear leg portions 21c or 23c. The terminal edge portions of each of the arm members 26 or 28 and each of the rear leg portions 21c or 23c are provided with a pair of spaced apart notches or grooves 37 within which to receive the two-prong claw 32, as is most clearly shown on the right-most frame member 23 of FIG. 1.

FIGS. 1 and 3 most clearly show the preferred construction for the main frame members 21 and 23 wherein each thereof are formed as from flat metal stock to have a widened central length section and elongated end portions which continue from one side of the widened central length section. It is convenient to turn down the elongated end portions thereof to comprise the leg portions 21b and 23b and 21c and 23c, and to turn down the other side of the widened central length section to comprise side flanges 21d and 23d whereby sufficient rigidity and strength of construction are imparted to the main frame members 21 and 23, respectively.

It is to be understood that the frame members 21 and 23 can be optionally constructed of a wide choice of materials, both metals and non-metals, but sufficient rigidity and strength must be preserved to prevent any axial deviation such as bend or warp away from the elongated axis of the frame members 21 and 23. The most critical component of any such axial deviation quite obviously would be the horizontal component thereof, which deviation would drastically affect the obtaining of accurate directional alignments for the associated coaxially aligned tires. With the frame members 21 and 23 attached to and abutting their associated tires generally along the length dimension thereof as disposed rearwardly of the extension arms 26 and 28, respectively, the frame members 21 and 23 lie or extend in nearly perfect parallel alignment with the travelling direction of the associated tires 27 and 29, respectively.

Therefore, it is at once made convenient to utilize the forward extension portions 21a and 23a of the main frame members 21 and 23, respectively, to include alignment reference means thereon as comprised in part by a pair of alignment apertures 41 and 43 positioned along the central elongated axis of the main frame member 21 and in part a pair of alignment reference indication notches 51 and 53 positioned along the centerline or central elongated axis of the main frame member 23. The apertures 41 and 43 and the notches 51 and 53 are placed in coaxial alignment, respectively, when the main frame members 21 and 23 are properly positioned and attached to their associated tires 27 and 29. The indication notches 51 and 53 are desirably located between parallel spaced perpendicular scores, as shown in FIG. 1, in order to define coaxially aligned areas 46 and 48, FIG. 6, across which to position the cross-arm member 25 for obtaining proper alignment references. Alternatively, as shown in the drawing, alignment reference indication means could as well be provided by a single centerline or central score 45 extending along the elongated axis of the main frame 23 substantially along the entire forward extension portion 23a. The coaxially aligned surface areas 46 and 48 of the extension portion 23a define inner and outer alignment reference positions, respectively, for the alignment reference indications means of the present invention.

The cross-arm frame member 25 is preferably provided as an elongated rod of circular cross-section and is conveniently comprised of separable length sections joined together by threaded engagement as through means of threaded end portions 25a and engaging nuts 25b FIGS. 1 and 4. The provision of separable length sections is thought to be advantageous to the break down or collapse of the elongated cross-arm frame member 25 for storage and shipping purposes, or to facilitate the change of the length dimension thereof for employment with wheel assemblies of varying width settings.

A selected end portion 25c of the cross-arm member 25 is configured to depend or hook at a right angle to the primary length section thereof, and when the cross-arm 25 is positioned to extend traversely of the generally parallel aligned main frame members 21 and 23, respectively (as shown in FIGS. 1 and 2), the hooked end portion 25c is downwardly turned and is engageable as by insertion within any selected one of the pair of alignment apertures 41 and 43. The cross-arm 25 is to be extended across the forward extension portion 23a of the parallel aligned frame member 23 so as to perpendicularly intersect the same and lie across the coaxially aligned indication areas 46 and 48 and to intersect the alignment notches or scores 51 and 53, respectively.

A slide member 60 is preferably provided in the configuration of a tubular collar and is to be mounted upon the distal or other end portion of the cross-arm 25. The slide member 60 is slideable therealong when loosened and is tightened with respect to the cross-arm 25 by conventional fastener means as by means of a threaded fastener element 63, best shown in FIG. 5, which can be conveniently caused to engage and tighten against the surface of the cross-arm 25. The slide member 60 comprises an adjustable indicator means for the checker tool assembly 20. FIG. 1 shows at 60' an altered position for the cross-arm member 25. It is convenient herein to say that the aperture 41 and the notch 51 within and together with the coaxially aligned reference area 46 for the frame members 21 and 23, respectively, define or comprise the aforementioned inner alignment reference position for the alignment reference means. Further, the aperture 43 and the notch 53 within and together with the coaxially aligned reference area 48 for the frame members 21 and 23, respectively, define or comprise the aforementioned outer alignment reference position thereof. The terms inner and outer have reference to proximity spacing with respect to the frontal surface of the associated pair of tires 27 and 29.

Now, there is shown in FIG. 2, and more clearly in FIG. 6, the cross-arm frame member 25 placed or positioned traversely of the frame member 23 in a predetermined alignment reference to the inner alignment position intended for the cross-arm 25. The hooked end portion of the cross-arm 25 is secured within the inner aperture 41. In a preferred method of checking or testing for directional misalignment of the associated pair of coaxially aligned tires 27 and 29, the slide member 60 is firstly positioned and then secured with a selected edge portion thereof aligned with the central notch 51 or the centrally extending score 45.

Thereafter, the cross-arm 25 is removed therefrom and is placed instead to extend traversely of the frame member 23 in alignment reference to the outer alignment position for the cross-arm 25, as shown by the dashed lines for the member 25 of FIGS. 2 and 6. The hooked end portion of the cross-arm 25 is then secured within the outer aperture 43. The selected edge portion of the slide member 60 is then checked or tested for any alignment variation with the central notch 53 or the centrally extending score 45. The alignment variation which does occur is indicative of a directional misalignment for the pair of associated tires 27 and 29. The distance of the misalignment as measured along the length of the cross-arm 25 is interrelated to or to be correlated with the degree or magnitude of the misalignment, i.e., an ⅛ or 1/16 or 1/32 inch misalignment, and the direction of the misalignment, as from the central alignment reference score 45, is indicative of the type of misalignment, i.e., toe-in or toe-out.

For example, in FIGS. 2 and 6, there is shown a variation in the alignment of the slide member 60 when the cross-arm 25 has been firstly aligned in the inner alignment reference position, and thereafter removed to the outer alignment reference position. The variation along the length of the cross-arm 25 is taken for predetermined correlation to the amount of or magnitude of the directional misalignment. This lineal misalignment can be measured as with the use of standard lineal measurement tools commonly known in the art. The direction of the misalignment is simply observed to signify toe-in or toe-out misalignment condition. The directional misalignment as indicated by the slide member 60 of FIGS. 2 and 6, lies to the outside of the alignment reference score 45, and this particular misalignment defines a toe-in condition. When the slide member 60 aligns to the inside of the alignment reference score 45, the indicated misalignment would be defined as a toe-out condition. That is to say, that the inner or outer directional shifting of the alignment reference score 45 with respect to the selected edge portion of the slide member 60 indicates to the reader a toe-in or toe-out misalignment, respectively.

It would as well be convenient for alignment reference to mark the slide member 60 with a central neutral score (not shown) to be used as a zero misalignment position, and to suitably mark the collar 60 on opposite sides of the neutral score with outwardly increasing calibrated marks (not shown) indicating desired unit measurements of directional misalignment, i.e., ⅛, 1/16 and/or 1/32 inches. It is not thought to be desirable to calibrate the cross-arm 25 due to the large extent of movements of the slide member 60 therealong so as to compensate for varying wheel base widths of different models and makes of wheeled vehicles. The width of the collar 60 could be made sufficient to measure a magnitude of directional misalignment up to ¼ or ⅜ inches, and the inner positioned calibration markings could be labeled to identify toe-in misalignment and the outer calibration markings could be labeled to identify toe-out misalignment. Optionally, it is obvious that the slide member 60 could instead be readjusted for alignment with the reference notch 45, and the amount of lineal adjustment then measured, instead of calibrating or marking the collar 60.

It is to be noted that the choice of materials comprising and selected dimensions for the checker tool assembly are not particularly critical for the successful use thereof, except that the length dimensions of the main frame members 21 and 23 are important insofar as the length dimension of the main frames as disposed rearwardly from the extension arms 26 and 28, and the spacing of the outer aperture 43 with respect to the inner aperture 41. That is to say, that it is desirable that the main frame members 21 and 23 be extended rearwardly sufficient to accommodate a selected range of tire sizes as, for example, the more common tire sizes for passenger automobiles.

It is in accordance with the principles of the present invention that the spacing between the inner and outer apertures 41 and 43 of the main frame be related in a predetermined manner to the rim size of the associated wheels 27 and 29. It is generally known that tire sizes are assigned and specified according to the diameter of the tire rim, i.e., a 12 inch tire size is called such in reference to the 12 inch diameter of the tire rim upon which the tire is mounted. Assuming that the wheel is in perfect or true alignment, an imaginary line subscribed through the center pivot point of the rim (not shown) to extend in the direction of rotation of the wheel would comprise a base zero reference line from which to determine directional misalignment of the wheel 27 or 29.

Provided that a selected wheel 27 is misaligned with respect to the base zero reference line, a second imaginary line subscribed through the center pivot point of the rim or wheel to extend in the direction of rotation of the wheel would comprise a secondary reference line defining between the secondary line and the base zero line, the angle of misalignment. The magnitude of misalignment is then measured and taken to be approximately equal to the lineal distance between the secondary and the base zero reference lines at points therealong, respectively, which are equal to the radius of the tire rim. In actuality, the shifting movement of the radial point on the base zero line would subscribe an arc along its path of movement to be superimposed upon the secondary line. The measurements of misalignment are not taken with the degree of accuracy that would make the difference in magnitude between the lineal separation of the two radii points and the distance along the subscription of the arc to be important for the purposes of testing for tire misalignment, either in performing state-of-the-art misalignment checks or for the purposes of the present invention.

Through the use of the main frame members 21 and 23, it is a principle of this invention that by aligning the slide member 60 to zero reference with respect to the reference score 45, another or substituted zero reference line can then be defined by an imaginary line drawn through the inner reference point for the associated main frame 21 or 23, and extended in parallel with the base zero reference line as discussed above. If the outer reference point for the associated main frame 21 or 23 is then determined to be spaced from the inner reference point for the frame members 21 or 23, respectively, by the radial dimension of the particular rim under test, the deviation of the slide member, when secondly compared to the reference score 45 during measurement in the outer alignment position as previously discussed, shall indicate the approximate lineal misalignment of the tire as measured from the substituted zero reference line. This misalignment approximation has been found to be entirely satisfactory for the purpose of consumer testing for in-tolerance or out-of-tolerance magnitudes of directional misalignment. The checker tool assembly 20 is reliable to determine toe-in or toe-out misalignments without regard to approximate magnitudes.

In a further consideration of the measurement of the directional misalignment through the use of the checker tool assembly 20, a right-angled triangle could be imagined as determined wherein the radial dimension of the rim along the base zero line defines the altitude or height a of the triangle, the base b thereof is determined by a line intersecting the point of radius on the base zero line at a right angle and extending to intersect the secondary reference line, and the distance along the secondary line to the point of origin at the pivotal center for the rim defines the hypotenuse c of the triangle. This same right-angled triangle is then found to be determined by the main frame members 21 and 23 wherein, with reference to the inner and outer alignment reference positions provided on the forward extension portions 21a and 23a, the altitude a of the triangle lies along the substituted zero reference line, the hypotenuse c is the separation of the inner and outer reference points along the main frame members 21 and 23, and the base b thereof is the observed misalignment of the slide member 60 from the central reference score 45. It is then shown that if the separation of the inner and outer reference points were correlated to the hypotenuse dimension rather than the radius dimension of the rim, the magnitude of the misalignment would be slightly more accurate. However, either approach to interspacing of the inner and outer reference points would be satisfactory for the intended purposes of the present invention.

Moreover, the main frame members 21 and 23 could be provided with a selected plurality of outer alignment reference points, as is intended to be illustrated in FIGS. 1 and 2 by the dashed line apertures 66 and 68, as well as the aperture 43. These outer alignment reference points 43, 66 and 68 can be spaced to relate to a corresponding selected plurality of tire sizes, for example, using the radial approximation measurements, the aperture 66 could be for use with a 13 inch tire, the aperture 68 could be for use with a 14 inch tire, and the aperture 43 could be for use with a 15 inch tire.

In a preferred embodiment of the invention there is only the single outer aperture 43 which is preferably removed from the inner aperture 41 by a selected fixed distance which generally exceeds the radial dimensions of the more common tire sizes for passenger vehicles. It is generally understood from a consideration of the preceding discussions of measurement geometry that the misalignment obtained will be slightly larger than the misalignment which would be read at the radial spacing along the frame members 21 and 23; however, the advantage of the provision of the single outer reference area 43, 53 for all rim sizes, ease of using the checker tool assembly 20, the non-criticality of the difference in readings to be obtained, and the ease of mathematically deriving the more accurate reading from first obtaining the misalignment at the single outer reference area 43, 53 dictates the practical and preferred embodiment of the single outer reference areas 43, 53.

For illustrative purposes, the spacing between the apertures 41 and 43, and between the areas 46 and 48 could be made to be ten (10) inches, which would permit the main frame members 21 and 23 to be used with the standard size tires of 10, 12, 13, 14, 15, 16, 16.5 and 20 inches. It would be easily within the ability of the user of the checker tool assembly 20 to make a misalignment check, and then compare the amount of determined misalignment to the size of tire being measured for obtaining the corrected directional misalignment of the tire size under test. It is readily apparent that for a size ten (10) inch tire having a radius of five (5) inches, the corrected misalignment would be one-half (½) of the measured misalignment taken at a fixed spacing of ten (10) inches. Likewise, for a size fifteen (15) inch tire having a radius of seven and one-half (7.5) inches, the corrected misalignment would be (7.5 ÷ 10) × the measured misalignment read at the fixed spacing of ten (10) inches.

It would be well within the skill of the art to provide a so-called comparison chart or table setting forth a variety of such conversions for differing tire sizes, and further setting forth certain recommendations respecting in-tolerance or out-of-tolerance levels for differing makes of automobiles having differing linkage and tie rod steering assemblies. For example, it is customary on most makes of automobile not to permit any degree of toe-out directional misalignment, but slight degrees of toe-in directional misalignment are more normally permitted. With the advantageous use of the checker tool assembly 20, it is possible for the consumer to quickly and accurately test for and measure any toe-in or toe-out misalignment, and based thereon, take steps to have the steering assembly readjusted to regain permitted tolerances of directional misalignment or to bring more nearly into perfect alignment as is well understood in the pertinent art. The present invention has the advantages of low cost and simplicity of construction and application, and, if used often, will result in saving unnecessary and abnormal tire wear through early detection of severe or out-of-tolerance directional misalignment.

It is further to be noted that through the use of the forwardly extending main frame members 21 and 23, that it is not readily determinable as to which individual tire of the coaxially aligned pair of tires, that may be out-of-tolerance or misaligned, due to the misalignment being measured between extensions of both tires. Any measured misalignment may be contributed to by both tires, or be entirely the result of the misalignment of a single one of the tires. However, from a practical standpoint, if one tire is aligned out-of-tolerance, the remedial adjustment to correct the misalignment must be done by subjecting the entire steering assembly to corrective alignment testing and adjustments.

It is of interest to note that the rear coaxially aligned pair of tires on an automobile are fixedly set with respect to the frame of the automobile, and are not adjustable as to directional alignment due to the rear wheels not ordinarily being used to steer the automobile. Hence, unless the supporting framework for the rear pair of wheels has been damaged to cause misalignment, the rear pair of wheels should be aligned along the aforementioned imaginary base zero alignment reference line. It is for this reason that when in true alignment, the rear pair of wheels can be similarly tested with the checker tool assembly 20 for testing the main frame members 21 and 23 for any elongated axial deviation or warp which would lie in the horizontal plane, as opposed to any vertical component of such deviation. Conversely, a detected misalignment of the rear pair of tires could be indicative of damage to the supporting framework causing wheel misalignment and resulting in adverse tire wear.

The checker tool assembly 20 of the present invention is most often used to check or test the alignment condition of the front pair of coaxially aligned wheels of a wheeled vehicle, that is, the steering wheels which have tie rod and linkage assemblies that are adjustable to realign the traveling direction of the wheels. The checker tool assembly 20 is preferably used as shown in the accompanying drawing so that the extension portions 21a and 23a of the main frame members 21 and 23 project forwardly of the associated front wheels 27 and 29; however, any misalignment is projected from the center pivot point of the wheel (rim) and can be as readily detected by reversing the direction of the extension portions 21a and 23a with respect to the wheels 27 and 29. The body of the vehicle would unfairly impede the freedom of aligning the cross-arm 25 so that while this approach is possible, it is not as practical, and thus is not a recommended method of use for the checker tool assembly 20.

It is to be understood that while the present invention has been shown and described with reference to a preferred embodiment thereof, the invention is not limited to the precise form set forth herein, and that various modifications and changes may be made therein, and it is intended to cover in the appended claims such modifications and changes as fall within and not depart from the true spirit and scope of the invention.

What is claimed is:

1. A wheel alignment checker tool assembly for use with a pair of spaced coaxially and parallel aligned wheel means comprising in combination a pair of elongated frame members, each frame member being attachable to an associated one of said pair of wheel means and having a forward portion thereof spaced forwardly from the associated wheel means, first coaxially aligned reference areas provided on said forward portions of the pair of frame members, respectively, second coaxially aligned reference areas provided on said forward portions of the pair of frame members, respectively, said second aligned reference areas being spaced forwardly along said frame members from said first aligned reference areas by predetermined lineal spacing therefrom, said first and second aligned reference areas having centerline reference means, respectively, a cross-arm member to be extended traversely intersecting the forward portions of said pair of frame members and firstly aligned for intersecting alignment with said first reference areas, and secondly aligned for intersecting alignment with said second reference areas, and adjustable indicator means mounted on said cross-arm member and extending firstly in alignment with the centerline reference means of said first reference areas, and extending secondly in alignment with the centerline reference means of said second reference areas whereby indications are provided for both the degree and type of coaxial misalignment.

2. A wheel alignment checker tool assembly as claimed in claim 1 wherein said predetermined lineal spacing is determined by the radius dimension of said wheel means.

3. A method for checking for coaxial alignment of a pair of spaced coaxially and parallel aligned wheel means of a wheeled vehicle, comprising the steps of providing a pair elongated frame members with forward extension portions thereof, marking said forward extension portions of the frame members to provide alignment reference means thereon including coaxially aligned inner and outer disposed alignment reference positions with respect to said wheel means, attaching said pair of frame members to said pair of wheel means, respectively, with said forward extension portions thereof extending forwardly of the wheel means, respectively, extending a cross-arm frame member traversely between the forwardly extending portions of the frame members in alignment with the inner reference position thereof, moving adjustable indicator means on said cross-arm frame member into predetermined alignment with the inner reference position of a selected one of said pair of frame members, extending the cross-arm frame member traversely between the forwardly extending portions of the frame members in alignment with the outer reference position thereof, and moving the adjustable indicator means on said cross-arm frame member to provide said predetermined alignment with respect to the outer reference position on the selected one of the pair of frame members, the length and direction of said latter movement along the cross-arm frame member being representative of the magnitude and type of coaxial misalignment of said wheel means.

4. A wheel alignment checker tool assembly for an automobile having a pair of oppositely and coaxially aligned wheel units subject to coaxial misalignment, said checker tool assembly comprising in combination a pair of first frame members, each thereof being generally elongated and to be fixedly attached to and positioned with respect to an associated one of the pair of coaxially aligned wheel units to extend in parallel alignment therewith, and each thereof further having a forward extension portion extending forwardly from the associated wheel unit and a pair of gripper means, respectively, effective to engage opposite sides of the associated wheel unit for maintaining the parallel aligned attachment thereto, alignment reference means provided on the pair of first frame members and disposed in spaced relationship along the forward extension portions, respectively, including inner alignment reference positions and outer alignment reference positions, respectively, a second frame member to be extended traversely between the forward extension portions of said pair of first frame members firstly to be extended in alignment with the inner alignment reference positions thereof and secondly to be extended in alignment with the outer alignment reference positions thereof in forward displacement from the associated wheel units, and adjustable indicator means slideably mounted to the second frame member and being movable lengthwise therealong, said indicator means to be aligned firstly with the inner alignment reference positions of said pair of first frame members, and to be aligned secondly with the outer alignment reference positions thereof wherein the degree of movement of the indicator means between a position of alignment with the inner alignment reference positions and a position of alignment with the outer alignment reference positions provides the degree of coaxial misalignment, and the direction of said movement of the indicator means along the second frame member provides the type of coaxial misalignment.

5. The wheel alignment checker tool assembly as claimed in claim 4 wherein each of said pair of first frame members further includes an arm member attached thereto generally along the intermediate length thereof and rearwardly of the forward extension portions thereof, said arm member extending outwardly therefrom generally at a right angle thereto and to be positioned to contact the associated wheel unit for providing the proper front to rear alignment of the first frame member with respect to the associated wheel unit.

6. The wheel alignment checker tool assembly as claimed in claim 4 wherein a selected one of said first frame members is provided with inner and outer disposed aperture means along said forward extension portion thereof to comprise said inner and outer alignment reference means, respectively, and the other one of said first frame members is provided with inner and outer disposed centerline reference means extending in coaxial alignment with said inner and outer aperture means, respectively, and said second frame member is engageable on a first end thereof in said inner and outer disposed aperture means, respectively, and for extension traversely of said inner and outer disposed centerline reference means, respectively, and said indicator means is firstly adjusted to be in alignment with the inner disposed centerline reference means to define a zero reference position along the second frame member, and is secondly adjusted to be in alignment with the outer disposed centerline reference means to determine the degree of coaxial misalignment of said associated pair of wheel units.

* * * * *